Aug. 11, 1953 W. M. BROWN 2,648,392
DRIVEN STEERABLE BOGEY FOR MULTIAXLE TRUCKS
Filed July 5, 1950 2 Sheets-Sheet 1
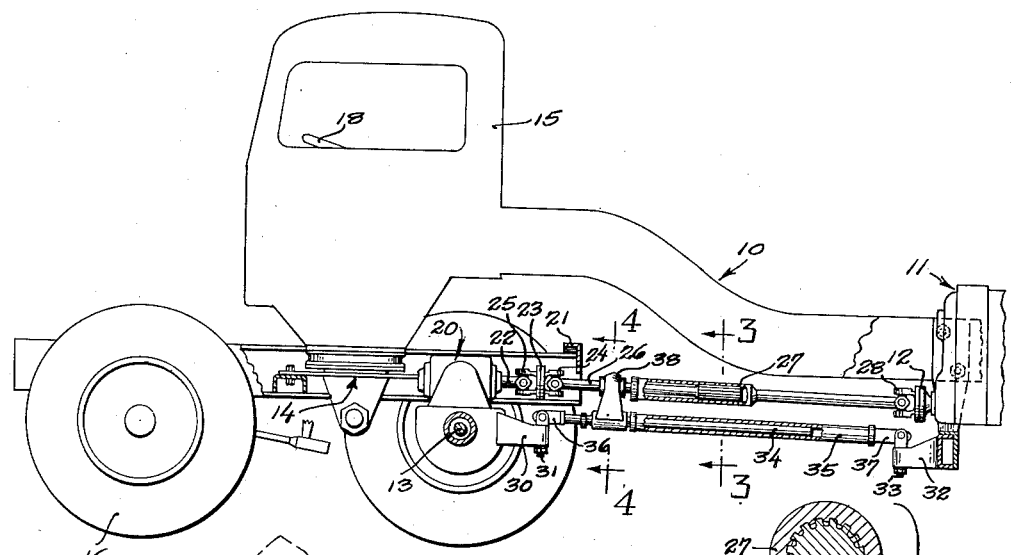
Fig. 1.
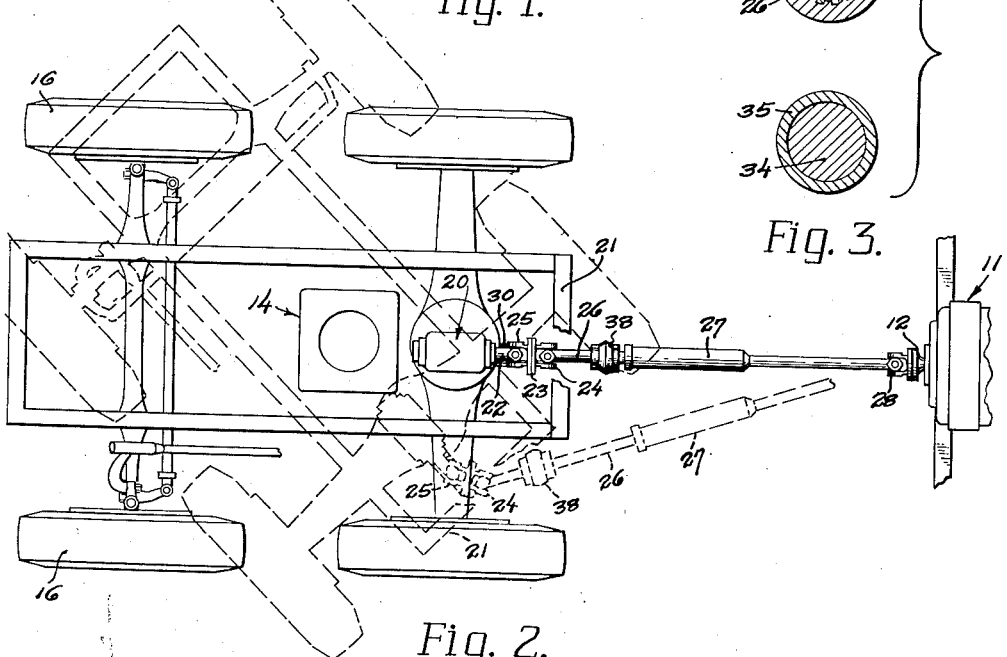
Fig. 2.
Fig. 3.
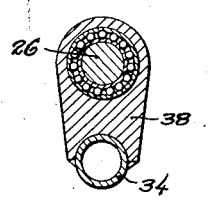
Fig. 4.
INVENTOR:
Wallace M. Brown
BY

Aug. 11, 1953   W. M. BROWN   2,648,392
DRIVEN STEERABLE BOGEY FOR MULTIAXLE TRUCKS
Filed July 5, 1950   2 Sheets-Sheet 2

INVENTOR.
Wallace M. Brown

Patented Aug. 11, 1953

2,648,392

UNITED STATES PATENT OFFICE 2,648,392

DRIVEN STEERABLE BOGEY FOR MULTIAXLE TRUCKS

Wallace M. Brown, Seattle, Wash., assignor to Kenworth Motor Truck Corporation, Seattle, Wash., a corporation of Washington Application July 5, 1950, Serial No. 172,074

3 Claims. (Cl. 180—23)

1

This invention relates to truck-and-trailer vehicles of the character in which the trailer is a semi-trailer, and with the truck complement being comprised of a bogey which connects with the trailer by a fifth-wheel and has its front wheels steerable. A rig of this general nature is illustrated and described in a pending patent application filed jointly by myself and Robert C. Norrie, and is peculiarised in that the vehicle's engine and also the driver's cab, from which steering motions originate, are each supported by the trailer frame, as distinguished from the usual practice of using the front-end truck as the support therefor, and with the power being taken from the trailer-carried engine to one or both tandem axles of a rear-end bogey, this again as distinguished from the usual practice of employing only the wheels of the front-end truck as traction wheels. It is preferable, in a rig of this character, to have each of the two tandem axles of the rear-end bogey driven from the engine, in which case the vehicle would be designated as an 8 x 4 unit, and namely eight wheels with four driven. It is still more desirable to also drive the rear axle of the steerable front-end bogey, thus to obtain an 8 x 6 unit, but this introduces a problem in that a drive taken forwardly from the trailer-carried engine to the rear wheels of the swingable front-end bogey must compensate itself to swing movements of the bogey. These swing movements would not, perhaps, be unduly troublesome were the pivotal center of the fifth-wheel assembly to be located to the rear of or even directly on the vertical center line of the front bogey's rear axle, thus to bring the said pivotal center into close proximity of a universal applied between the forwardly extending drive line and a stub shaft leading into an axle-driving differential, but proper distribution of weight between front and rear axles of the front-end bogey dictates a location of the fifth-wheel well to the front of the rear tandem axle. In order, therefore, to enable the rig to be brought into the 8 x 6 category, it becomes necessary to employ an extensible propeller shaft and give such support thereto as will permit relatively wide angles between joined complements thereof and at the same time assure free telescoping action within the length of the shaft with no liability of binding. The object of the present invention is to provide a rig of the described character, namely one in which both the rear bogey and the steerable front bogey each give traction to the vehicle by power taken from an engine which is supported upon the trailer, and wherein the drive to the

2 front traction wheels compensates itself to rather wide swing movements of the steerable bogey as the same turns about the center of the fifth-wheel as an axis.

Other and more particular objects and advantages of the invention will, with the foregoing general object, appear and be understood in the course of the following description and claims.

In the accompanying drawing:

Figure 1 is a fragmentary view partly in side elevation and partly in longitudinal vertical section illustrating an arrangement embodying the teachings of the present invention for carrying the drive forwardly from a trailer-carried engine to a steerable bogey serving as the front-end support for the trailer.

Fig. 2 is a somewhat schematic top plan view of said steerable bogey and its drive line and employing full and dotted lines to indicate the swing action of the bogey.

Fig. 3 is a transverse vertical sectional view drawn to an enlarged scale on line 3—3 of Fig. 1.

Fig. 4 is a transverse vertical sectional view drawn to the same enlarged scale on line 4—4 of Fig. 1.

Figure 5:
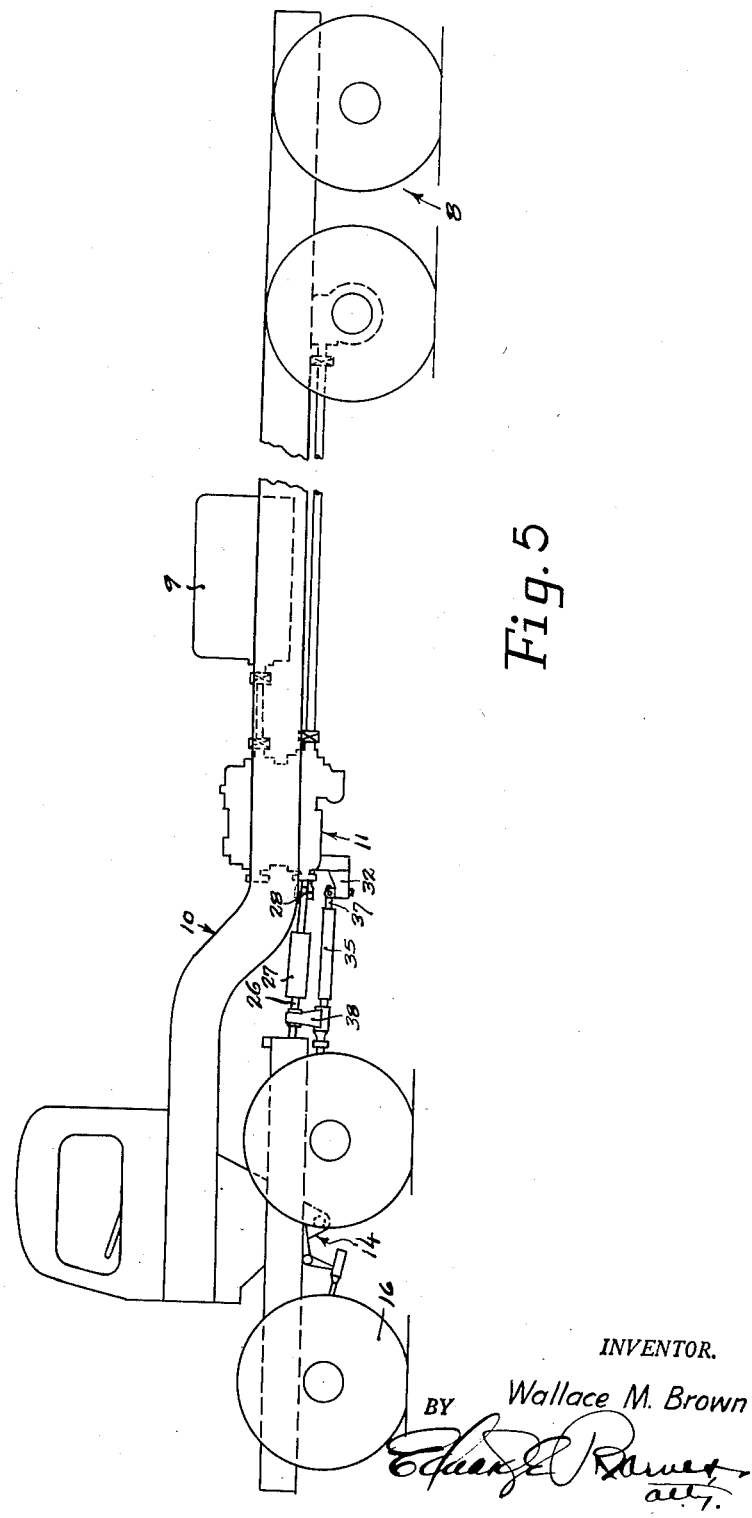
Fig. 5 is a schematic side elevational view illustrating the complete truck-and-trailer.

To reiterate that which has been previously pointed out, the semi-trailer, designated generally by the numeral 10, derives support for its rear end from a bogey 8. Power taken from a trailer-carried engine 9, is fed into a transfer case 11 where it is divided and carried both forwardly and rearwardly, the forward drive, hereinafter described, connecting with a coupling flange 12 and serving to give traction to the rearwardly placed axle 13 of a steerable bogey which supports the front end of the trailer. This front-end bogey connects with the trailer by a fifth-wheel assembly 14 and in the embodiment which I have elected to show this fifth-wheel lies directly below a driver's cab 15 sustained by the trailer to occupy a position at the extreme front end of the latter. The steerable front wheels 16 of the front-end bogey are carried by the usual steering knuckles and are controlled by movements originating within the cab. The connection from a steering wheel 18 contained in the cab to the said steering knuckles includes a drag-link (not shown) received for vertical movement through the center opening of the fifth wheel. A truck-and-trailer unit embodying this steering system and to which the teachings of the instant invention are peculiarly applicable is illustrated and described in the pending application hereinbefore identified. While it is perhaps well to point out that proper distribution of load between the front and rear axles of the front-end bogey demands that the fifth wheel occupy a position well ahead of the rear axle, thus dictating that a differential which is associated with the live rear axle 13 partake of a rather wide swing arc as the bogey turns about the center of the fifth wheel as an axis, there is no need to here consider the structural details of the front-end bogey. As distinguished from the bogey shown and described in said pending application there is, however, one change in the details of construction of the frame which should, perhaps, be here noted, and that is the use at the rear end of the frame of a kicked-up cross member 21, the purpose being to assure clearance aft of the differential for a rearwardly pointing stub shaft 22 which carries the drive into the differential.

Employed in the present invention to occupy a position to the rear of the differential is a double universal joint, and namely a joint having a double-yoked center section 23 connected between end yokes 24 and 25. One of the two end yokes is fixedly secured upon the rear end of the stub shaft 22 and the other of the two end yokes connects with a stud shaft 26 constituting a part of a propeller shaft and also serving as one of the two components of a sliding spline. At its rear extremity, the female complement 27 of said stud section connects by a universal joint 28 with the coupling flange 12.

Below the double universal joint and welded or otherwise made a rigid part of the housing 20 for the differential is a bracket 30, and supported by this bracket is a wrist pin 31 journaled to turn about an axis coinciding with a perpendicular dropped from the center line of said joint. A similar bracket 32 is also provided below the universal joint 28, being in this instance rigidly secured either to the main frame of the semi-trailer or to the transfer case 11, and this latter bracket gives journal support to a second wrist pin 33 whose axis coincides with a perpendicular dropped from the center line of the said universal 28. Serving as a stabilizing bar for the double universal joint 23—24—25, two telescopically associated rods 34 and 35 extend between and are connected by eyed ends 36 and 37 to the wrist pins, being disposed to occupy a horizontal plane paralleling the plane occupied by the male and female complements 26 and 27 of the sliding spline, and to establish the stabilizing connection between this bar structure and the said double universal joint the forwardly disposed male section 26 is given a mounting in the journal of a bearing box 38 welded or otherwise rigidly secured to said rod 34.

From the foregoing it will be apparent that the stabilized single and double universal joints which I have engineered into the forwardly extending extensible propeller shaft compensate the shaft to the rather wide swing arcs to which the differential housing of the front-end bogey is subject as the bogey turns about the center of the fifth wheel as an axis, thus making it possible to obtain a desirable truck-and-trailer rig falling in the 8 x 6 category. It is quite important that the box in which the propeller shaft is journaled be held against any rotational movement, and any liability of wear in the wrist connection for the rod section which carries this box should be avoided. In this connection it may be pointed out that my illustration of a pin-and-eye mounting for the rod section 34 is for purposes of simplifying the illustration. A suggested more desirable mounting is one providing a yoke upon the end of the rod and having a cross-link therefor extending as a T-head part from the wrist pin.

The invention and its accomplishments should be clear from the foregoing detailed description of my now preferred embodiment. It is my intention that no limitations be implied and that the hereto annexed claims be read with the broadest interpretation to which the employed language fairly admits.

What I claim is:

1. Means for carrying the drive from an engine supported upon a vehicle frame to the live axle of a wheeled truck giving support to the front end of said frame and swivelled thereto for turning movements about a vertical axis, comprising a driving stub shaft driven off the engine and pointing forwardly on the longitudinal median line of the frame, a driven stub shaft driving the live axle and pointing rearwardly on the longitudinal median line of the truck, a propeller shaft embodying within its length a sliding spline and extending between said stub shafts with the rear end coupled to the said driving stub shaft by a single universal joint and the front end coupled to the said driven stub shaft by a double universal joint, a stabilizing bar disposed to occupy a position below and parallel to the propeller shaft and composed of telescoping sections of which the section which lies at the rear has its outer end swivelled for wrist movement about an axis relatively fixed to coincide with a perpendicular dropped from the knuckle axis of the single universal joint and of which the section which lies at the front has its outer end swivelled for wrist movement about an axis relatively fixed to coincide with a perpendicular dropped from midway between the knuckle axes of the double universal joint, and a bearing box made rigid with the front-end section of the telescoping stabilizing bar and giving journal support to the front-end section of the extensible propeller shaft.

2. Means for carrying the drive from an engine supported upon a vehicle frame to the live axle of a wheeled truck giving support to the front end of said frame and swivelled thereto for turning movements about a vertical axis, comprising a driving stub shaft driven off the engine and pointing forwardly on the longitudinal median line of the frame, a driven stub shaft driving the live axle and pointing rearwardly on the longitudinal median line of the truck, a propeller shaft embodying within its length a sliding spline and extending between said stub shafts with the rear end coupled to the said driving stub shaft by a single universal joint and the front end coupled to the said driven stub shaft by a double universal joint, a telescoping stabilizing bar held against rotation and extending parallel to the propeller shaft with its rear-end section swivel-connected to the vehicle frame and its front-end section to the truck to turn about vertical axes one coinciding with a perpendicular dropped from the knuckle axis of the single universal joint and the other with a perpendicular dropped from midway between the knuckle axes of the double universal joint, and a bearing box made rigid with the front-end section of the telescoping stabilizing bar and giving journal support to the front-end section of the extensible propeller shaft.

3. Means for carrying the drive from an engine supported upon a vehicle frame to the live axle of a wheeled swivelling truck giving support to an end of said vehicle frame, comprising a propeller shaft embodying a sliding spline within its length and having single and double universal joints at the opposite ends thereof, the former said joints connecting with the engine so as to establish a driving couple from the engine to the propeller shaft, the latter said joint connecting with the live axle so as to establish a driving couple to the live axle, a stabilizing bar disposed to occupy a position parallel to the propeller shaft and composed of telescoping sections of which the section which lies at the rear has its outer end swivelled for wrist movement about an axis relatively fixed to coincide with a perpendicular passing through the knuckle axis of the single universal joint and of which the section which lies at the front has its outer end swivelled for wrist movement about an axis relatively fixed to coincide with a perpendicular passing through a point midway between the knuckle axes of the double universal joint, and a bearing box made rigid with the front telescoping section of the stabilizing bar and providing a journal for the front-end section of the extensible propeller shaft.

WALLACE M. BROWN.

References Cited in the file of this patent

UNITED STATES PATENTS

| Number | Name | Date |
|---|---|---|
| 2,139,963 | Leason | Dec. 13, 1938 |
| 2,291,626 | Huber | Aug. 4, 1942 |
| 2,384,092 | Hollos | Sept. 4, 1945 |
| 2,429,492 | Scranton | Oct. 21, 1947 |